United States Patent
Maeda

Patent Number: 5,229,049
Date of Patent: Jul. 20, 1993

[54] METHOD FOR MANUFACTURING PRE-EXPANDED PARTICLES OF POLYOLEFIN RESIN

[75] Inventor: Hirofumi Maeda, Takatuki, Japan

[73] Assignee: Honda Giken Kogyo Kabushiki Kaisha, Tokyo, Japan

[21] Appl. No.: 798,054

[22] Filed: Nov. 27, 1991

Related U.S. Application Data

[63] Continuation of Ser. No. 401,265, Aug. 31, 1989, abandoned.

Foreign Application Priority Data

Aug. 31, 1988 [JP] Japan .................................. 63-218876

[51] Int. Cl.$^5$ ............................................. B29C 67/22
[52] U.S. Cl. ........................................ 264/51; 264/53; 521/56; 521/60
[58] Field of Search ................. 264/51, 53, 54, 55, 264/DIG. 9, DIG. 16; 521/56, 60

[56] References Cited

U.S. PATENT DOCUMENTS

| | | | |
|---|---|---|---|
| 4,525,485 | 6/1985 | Maeda et al. | 264/DIG. 9 |
| 4,532,263 | 7/1985 | Krutchen et al. | 264/DIG. 9 |
| 4,540,718 | 9/1985 | Senda et al. | 264/DIG. 9 |
| 4,720,509 | 1/1988 | Nakamura | 264/DIG. 9 |
| 4,782,098 | 11/1988 | Allen et al. | 264/53 |
| 4,810,440 | 3/1989 | Yoshida et al. | 264/DIG. 9 |

Primary Examiner—Allan R. Kuhns
Attorney, Agent, or Firm—Armstrong, Westerman, Hattori, McLeland & Naughton

[57] ABSTRACT

A method for manufacturing pre-expanded particles of polyolefin resin from strand pellets having Tm in melting temperature measured by DSC method, wherein the expansion ratio E of the pre-expanded particles of the resin, the length l and the average diameter d of the strand pellets after having been heated at a temperature (Tm−5° C.) are in the following relational expression.

$$0.04E + 0.9 \leq l/d < 0.15E + 1.3$$

According to the method of the present invention, it is possible to manufacture uniform, spherical pre-expanded particles easily at a moderate cost and obtain a fine-looking expansion-molded articles.

2 Claims, 2 Drawing Sheets

METHOD FOR MANUFACTURING PRE-EXPANDED PARTICLES OF POLYOLEFIN RESIN

This application is a continuation of application Ser. No. 401,265, filed Aug. 31, 1989, now abandoned.

BACKGROUND OF THE INVENTION

1. Field of the Invention

The present invention relates to a method for manufacturing pre-expanded particles for expansion molding in a mold (hereinafter referred to as "expansion molding").

2. Description of the Prior Art

The expansion molding by the use of pre-expanded particles of polyolefin such as polypropylene has hitherto been used widely. There have been proposed a number of techniques relating to the shape of such pre-expanded particles, but most of them relate to the method for manufacturing spherical pre-expanded particles. As to the method for manufacturing spherical pre-expanded particles, there is disclosed in e.g. Japanese Laid-open Patent Publication 41777/77 a method for suspending ethylene resin particles in an aqueous solution and then heating the suspension to a temperature above the melting point of the resin so as to manufacture spherical particles. This method, however, had a problem of requiring an additional step for sphering the resin particles, this resulting in a rise of the manufacturing cost. In the expansion molding using pre-expanded beads, it is possible to improve the charging-in-a-mold property by making the pre-expanded particles as uniform and spherical as possible. If charging into the mold cannot be done properly, molded articles obtained by heating and subsequent cooling become worse in physical properties such as external appearance and dimensional shrinkage rate with respect to the mold, restoration rate from compression-induced strain, this resulting in failure of obtaining a satisfactory molded articles. Hence, there has been a strong need for a method for obtaining uniform and spherical pre-expanded particles easily at a moderate cost.

SUMMARY OF THE INVENTION

It is a primary object of the present invention to provide a method for manufacturing pre-expanded particles of a polyolefin resin easily at a moderate cost.

Another object of this invention is to provide polyolefin resin particles good in external appearance.

Further objects and advantages of this invention will become apparent to those skilled in the art from reading of the detailed explanation below.

In view of the aforementioned situation, the present inventor has made an intensive study for attaining the afore-mentioned objects, trying hard to make pre-expanded polyolefin resin particles as uniform and as spherical as possible and found out that there is a fixed relationship between the size and shape of the pre-expanded particles of polyolefin resin obtained from strand pellets and the amount of strain (heating-induced shrinkage) caused in the course of manufacture of strand pellets, thus completed the invention.

DETAILED DESCRIPTION OF THE INVENTION

Figure 1:
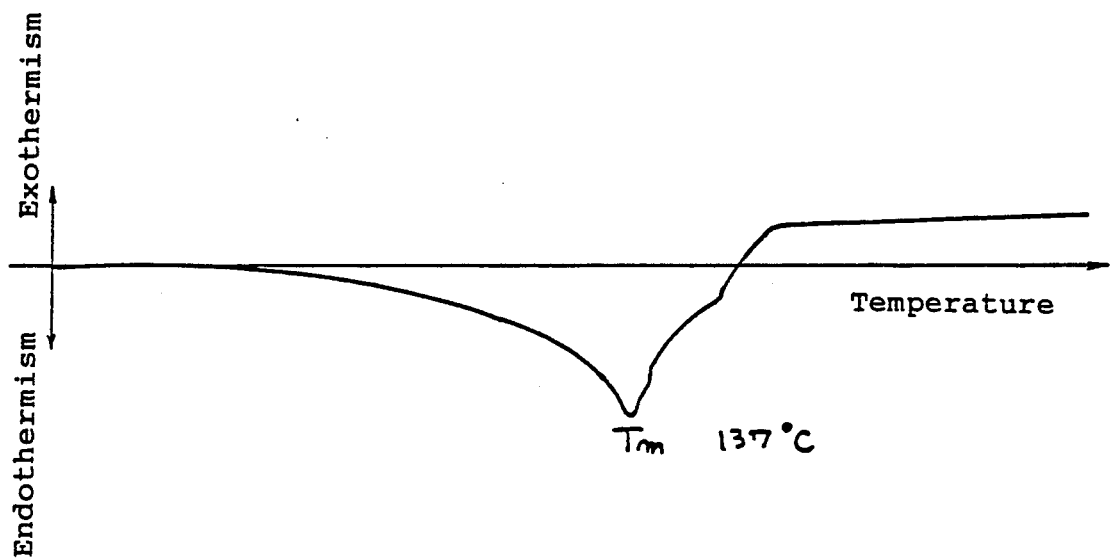
FIG. 1 is a graph showing as thermogram the DSC melting behavior of ethylene-propylene random copolymer conceptually.

The present invention relates to a method for manufacturing pre-expanded particles of polyolefin resin from strand pellets with a melting point of Tm by the DSC method, wherein the relationship between the expansion ratio E of said pre-expanded particles and the length l and the average diameter d of the strand pellets after having been heated at a temperature (Tm−5° C.) is represented by the following formula;

$$0.04E + 0.9 \leq l/d < 0.15E + 1.3$$

and still more preferably by the following formula;

$$0.068E + 1.1 < l/d < 0.123E + 1.2$$

In the present invention, the expansion ratio means ratio in bulk.

As the polyolefin resin constituting pre-expanded particles, any resin may be used with no particular limitation if it is pelletizable by extrusion and pre-expandable. Examples of such polyolefin resin are polypropylene, ethylene-propylene copolymer, ethylene-vinyl acetate copolymer, polybutene-1 and poly-4-methylpentene-1, but preferred are non-crosslinked or slightly crosslinked polypropylene resins.

The aforementioned polyolefin resin is extruded by an extruder for pellet making after addition of some organic or inorganic fillers, antioxidants, ultraviolet ray absorbers, flame retardants, pigments or the like as necessary. Extrusion is done through a die in strand form and cut to a predetermined length to make strand pellets.

When the strand pellets are made, the resin melt is drawn through the die of the extruder, this usually resulting in a strain. The amount of this strain varies according to the extrusion conditions such as the die's nozzle diameter and extrusion temperature as well as the drawing speed to the extrusion rate. It is normally impossible to reduce this amount of strain to zero.

There are a number of measuring methods for the amount of strain having occurred but normally it is determined by heating the resin at a given constant temperature below the resin's melting point. If the heating temperature below the resin's melting point is too low, however, thermal shrinkage may not take place. If it is too close to the resin's melting point, the resin is possibly molten so that the amount of strain cannot be grasped stably.

Here, as factors of the shrinkage by heating, pellets of the resin are heat-treated in a silicone oil for 5 minutes at a temperature of (Tm−5° C.) and after subsequent cooling with a silicone oil at the room temperature, l and d of the pellets are measured.

Manufacture of the expanded particles of polyolefin resin of the present invention consists in dispersing in water in a pressure vessel polyolefin resin pellets together with a volatile blowing agent such as dichlorodifluoromethane (if necessary, proper dispersing agent such as tertiary calcium phosphate may be used), heating said pellets under stirring to a vicinity of the Tm (the melting point measured by DSC method) and then opening the valve in the bottom of the pressure vessel to let out water and said pellets into a normal-pressure atmosphere.

In the present invention, the measuring of the melting point by DSC method has been made by the use of a normal differential scanning calorimeter (manufacturer: Perkin-Elmer, DSC-2 type device etc.), the sample quantity being 1-15 mg and the heating rate being 10° C./minute.

FIG. 1 is a thermogram conceptionally showing the DSC thermal behavior of the resin itself (in pellet form) using ethylene-propylene random copolymer (ethylene content 4.5 wt. %) as polyolefin resin.

Further detailed description of the present invention is given below by way of Examples but, needless to say, it is not limited thereby.

EXAMPLES 1-22

Ethylene propylene random copolymer material A (ethylene content=3.0 weight %, Tm=145° C. as measured by DSC method, MFR=6 g/10 min.) and material B (ethylene content=4.5 weight %, Tm=137° C. as measured by DSC method, MFR=7 g/10 min.) were extruded by the use of a 90 mm extruder through a 72-nozzle die with a nozzle bore of 1.0 or 1.2 mm$\phi$ and an extrusion rate of 70 kg/h-100 kg/h into various strand pellets. The conditions of pellet manufacture and the properties of the pellets obtained are as shown in Table 1.

In Table 1, 100 weight parts of strand pellets thus obtained were dispersed in 300 weight parts of water in a pressure vessel together with a given quantity (25-50 weight parts) of dichlorofluoromethane, and after heating to a predetermined temperature (130°-145° C.) and the resin particles were let out through 4 mm$\phi$ orifices in the bottom of the pressure vessel with dichlorofluoromethane being added and the internal pressure being kept at the predetermined level (15-30 kg/cm$^2$G) into the normal-pressure atmosphere, and pre-expanded particles at the respective expansion ratios were thus obtained. The pre-expansion conditions and properties of the pre-expanded particles are shown in Table 1.

Figure 2:
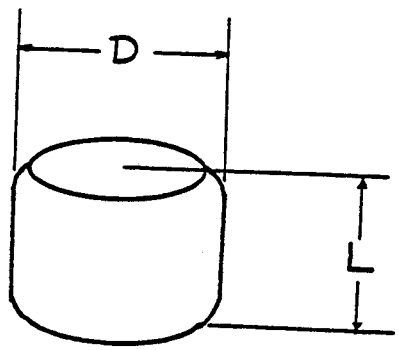
FIG. 2 is a schematic diagram showing the relationship between the average diameter D and the length L of pre-expanded particles.

As shown in FIG. 2, however, $D = D^{max} + D^{min}/2 =$ Average diameter of pre-exanded particles $L =$ Length of pre-expanded particles The pre-expanded particles so obtained were pressure-treated with pressurized air (approx. 60° C., 9 kg/cm$^2$G) under heating and with an internal pressure thus imparted, they were filled in a mold (250×270×50 mm) and heated with water vapor then cooled and taken out of the mold and thus sheet-like expansion-molded articles were obtained. The respective expansion-molded articles were examined in external appearance and the results are as shown in Table 1.

The ranking criteria for external appearance were as follows.

⊙: Excellent—Aggregate of uniform particles corresponding to styrol foam and fine in appearance ○: Good—Aggregate of particles with a slight irregularity ×: Bad—Aggregate of irregular particles, low in commercial value

TABLE 1

| Examples | Kind of resin | Nozzle's diameter of die (mm) | Extrusion conditions Extrusion rate (Kg/Hr) | Extrusion conditions Temp. of die (°C.) | Weight of 1 grain (mg) | $l_0/d_o$ | $l/d$ | Pre-expanded particles Expansion ratio | Pre-expanded particles L/D | External appearance of expansion-molded articles |
|---|---|---|---|---|---|---|---|---|---|---|
| 1 | A | 1.2 | 100 | 220 | 1.8 | 3.0 | 2.1 | 10 | 1.0 | ⊙ |
| 2 | " | " | " | " | " | " | " | 6 | | ○ |
| 3 | " | " | " | " | " | " | " | 16 | 0.8 | ⊙ |
| 4 | " | " | " | " | " | " | " | 30 | 0.6 | ○ |
| 5 | " | " | " | " | " | " | " | 40 | 0.5 | × |
| 6 | A | 1.2 | 60 | 220 | 1.8 | 3.0 | 2.6 | 10 | 1.3 | ○ |
| 7 | " | " | " | " | " | " | " | 6 | 1.6 | × |
| 8 | " | " | " | " | " | " | " | 16 | 1.0 | ⊙ |
| 9 | " | " | " | " | " | " | " | 30 | 0.7 | ○ |
| 10 | " | " | " | " | " | " | " | 40 | 0.6 | ○ |
| 11 | A | 1.0 | 60 | 220 | 1.8 | 4.0 | 3.5 | 10 | 1.6 | × |
| 12 | " | " | " | " | " | " | " | 6 | 2.1 | × |
| 13 | " | " | " | " | " | " | " | 16 | 1.3 | ○ |
| 14 | " | " | " | " | " | " | " | 30 | 0.9 | ⊙ |
| 15 | " | " | " | " | " | " | " | 40 | 0.85 | ○ |
| 16 | " | " | " | " | " | " | " | 22 | 1.1 | ⊙ |
| 17 | B | 1.2 | 100 | 215 | 1.3 | 3.4 | 2.9 | 33 | 0.75 | ○ |
| 18 | " | " | " | " | " | " | " | 15 | 1.2 | ⊙ |
| 19 | " | " | " | " | " | " | " | 46 | 0.65 | ○ |
| 20 | B | 1.2 | 100 | 215 | 1.8 | 4.7 | 4.0 | 33 | 0.95 | ⊙ |
| 21 | " | " | " | " | " | " | " | 15 | 0.8 | × |
| 22 | " | " | " | " | " | " | " | 46 | 1.6 | ○ |

$d_0 = d_0^{max} + d_0^{min}/2$

Figure 3:
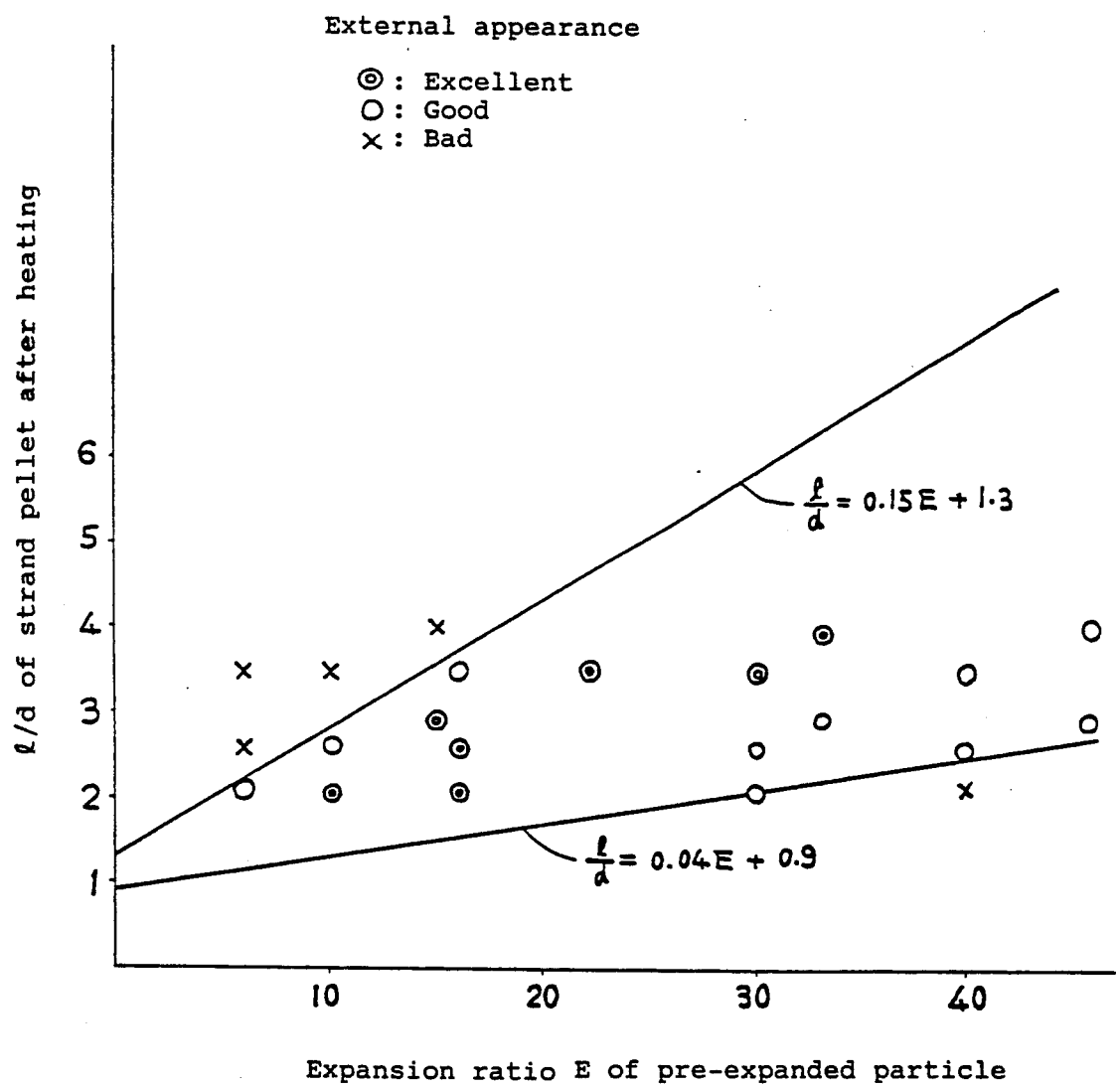
FIG. 3 is a graph showing the expansion ratio of pre-expanded particles, l/d of a strand pellet after heating and external appearance of the molded article.

= Average diameter of material pellets $l_0$ = length of material pellets $d = d^{max} + d^{min}/2$ = Average diameter of pellets after heating $l$ = Length of pellets after heating The l/d of strand pellets after heating, expansion ratio of pre-expanded particles and external appearance of molded articles given in Table 1 are shown in FIG. 3.

From the results shown in FIG. 3, it is understandable that the expansion-molded articles good in appearance are obtainable under conditions encompassed by the curves represented by the formulae l/d=0.15E+1.3 and l/d=0.04E+0.9.

As mentioned above, expansion-molded articles good in external appearance are attainable according to the present invention.

What is claimed is:

1. In a method for manufacturing pre-expanded particles from strand pellets of a polyolefin resin having a $T_m$, as measured by the DSC method, the improvement which comprises preparing, selecting and using strand pellets having a length l and an average diameter d after having been heated at a temperature $(T_m-5°$ C.) and pre-expanding the strand pellets by mixing them with water and a blowing agent at an elevated temperature and at a pressure of 15–30 kg/cm$_2$G and ventilating the mixture through an orifice to obtain pre-expanded particles having an expansion ratio E, said l, d and E all satisfying the relationship defined by the formula (I):

$$0.04E+0.9 \leq l/d < 0.15E+1.3 \quad (I)$$

said pre-expanded particles having enhanced surface properties when molded.

2. A method according to claim 1, wherein the relationship defined by the formula is represented by the following formula (II);

$$0.068E+1.1 < l/d < 0.123E+1.2 \quad (II).$$

* * * * *